US006411946B1

(12) United States Patent
Chaudhuri

(10) Patent No.: US 6,411,946 B1
(45) Date of Patent: Jun. 25, 2002

(54) ROUTE OPTIMIZATION AND TRAFFIC MANAGEMENT IN AN ATM NETWORK USING NEURAL COMPUTING

(75) Inventor: Aloke Chaudhuri, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/143,687

(22) Filed: Aug. 28, 1998

(51) Int. Cl.[7] ................................................ G06N 3/04
(52) U.S. Cl. .......................................... 706/21; 705/40
(58) Field of Search .............................. 706/21; 705/40

(56) References Cited

PUBLICATIONS

Neves, J.E.; Leitao, M.J.; Almeida, L.B., Adaptive technique for ATM call admission and routing control using traffic prediction by neural networks, computers and Communications, 1997. Proceedings., Second IEEE Symposium on, Jul. 1–3, 1997, ISBN: 0–8186.*
Pan, H.; Wang, I.Y., The bandwidth allocation of ATM through genetic algorithm, Global Telecommunications Conference, 1991. GLOBECOM '91. Countdown to the New Millenium. Featuring a Mini–Theme on: Personal Communications Services, 1991, pp.: 125–129, Jan. 1, 1991.*
Fan, Z.; Mars, P., Access flow control scheme for ATM networks using neural–network–based traffic prediction, Communications, IEE Proceedings–vol.: 144 5, Oct. 1997, pp.: 295–300.*

Young–Keun Park; Gyungho Lee, Intelligent congestion control in ATM networks, Distributed Computing Systems, 1995., Proceedings of the Fifth IEEE Computer Society Workshop on Future Trends of, 1995, pp.: 369–375, Jan. 1995.*

Yao–Ching Liu; Douligeris, C., Feedback congestion controller for ATM networks using a neural network traffic predictor, Southcon/95. Conference Record, 1995, pp.: 398–402, Jan. 1995.*

Tarraf, A.A.; Habib, I.W.; Sadawi, T.N.; Ahmed, S.A., ATM multimedia traffic prediction using neural networks, Global Data Networking, 1993. Proceedings, pp.: 77–84, Jul. 1997.*

* cited by examiner

Primary Examiner—Mark R. Powell
Assistant Examiner—Wilbert Starks
(74) Attorney, Agent, or Firm—Barry R. Lipsitz

(57) ABSTRACT

Neural computing techniques are used to optimize route selection in a communication network, such as an ATM network. Output measurements of the network are used to provide optimal routing selection and traffic management. Specifically, link data traffic is monitored in the network to obtain traffic history data. An autoregressive backpropagation neural network is trained using the traffic history data to obtain respective predicted traffic profiles for the links. Particular links are then selected for carrying data based on the predicted traffic profiles. A cost function, limits on network parameters such as link cost and cell rate, and other quality of service factors are also considered in selecting the optimal route.

40 Claims, 4 Drawing Sheets

ROUTE OPTIMIZATION AND TRAFFIC MANAGEMENT IN AN ATM NETWORK USING NEURAL COMPUTING

BACKGROUND OF THE INVENTION

The present invention relates to a method and apparatus for using neural computing techniques, also known as neural networks, to optimize route selection in a computer communication network. The invention is particularly suitable for use with ATM networks, but can be used in other networks with Quality of Service requirements, such as IP and the OSI family of protocols.

The following acronyms are used:
ABR—Available Bit Rate
ARBP—Autoregressive Backpropagation
ARIMA—Autoregressive Integrated Moving Average
ARMA—Autoregressive Moving Average
ATM—Asynchronous Transfer Mode
B-ISDN—Broadband Integrated Services Digital Network
CAC—Connection Admission Control
CBR—Constant Bit Rate
CDV—Cell Delay Variation
IBT—Intrinsic Burst Tolerance
IP—Internet Protocol
NNI—Network-to-Network Interface
OSI—Open Systems Interconnection
PCR—Peak Cell Rate
PVC—Permanent Virtual Circuit
QoS—Quality of Service
SCR—Sustainable Cell Rate
SVC—Switched Virtual Circuit
TCP—Transmission Control Protocol
UBR—Unspecified Bit Rate
UNI—User-to-Network Interface
UPC—Usage Parameter Control
VBR—Variable Bit Rate Computer networks continue to carry increasing amounts of data traffic for various purposes. For example, the popularity of the Internet for educational, business and entertainment purposes is rapidly increasing. Moreover, local area networks, metropolitan area networks, and wide area networks have also become increasingly popular for use by corporations, the government, universities and the like. Furthermore, integration of networks that carry audio, video and other data is occurring.

Accordingly, different data transmission protocols have been developed in an attempt to manage the flow of data in these networks to avoid congestion and increase system throughput.

In particular, the ATM protocol is designed to provide a high-speed, low-delay multiplexing and switching network that supports any type of user traffic, such as voice, data, or video applications. ATM is an underlying technology for B-ISDN, which can offer video on demand, live television from multiple sources, full motion multimedia electronic mail, digital music, LAN interconnection, high-speed data transport for science and industry, and other services via an optical fiber telephone line.

Since ATM is a connection-oriented protocol, a virtual circuit is established prior to sending data. The virtual circuit defines the travel path for the data, e.g., which switches and transmission links are to be traversed. User traffic is segmented into small, fixed-length cells of 53 bytes each with cell headers that identify the virtual circuit. During transmission, high-speed switches read the cell header to relay the traffic to the next designated destination.

To optimize network resources and control congestion, various factors must be considered in selecting a virtual circuit. For example, an ATM network is required to perform a set of actions called Connection Admission Control (CAC) during a call setup to determine if a user connection will be accepted or rejected. However, traffic management through CAC offers a significant challenge to the designer. Complexity arises from the need to support the natural bit rates of all multi-application traffic being serviced in different consumer classes (e.g., CBR, UBR, VBR and ABR) through optimal sharing of bandwidth.

Additionally, various QoS parameters must be met. These parameters relate to cell error ratio, severely-errored cell block ratio, cell loss ratio, cell mis-insertion rate, cell transfer delay, mean cell transfer delay, and cell delay variation, for example.

Accordingly, an appropriate routing technique must be used to select an optimum virtual circuit and manage network traffic. Conventional routing techniques include non-adaptive algorithms (e.g., static routing) that do not base their routing decisions on real-time measurements or estimates of the current traffic and topology. The optimal route can therefore be computed in advance, off-line, and downloaded to the appropriate routers.

Static techniques includes shortest path routing, flooding, and flow-based routing.

In contrast, adaptive or dynamic routing algorithms change their routing decisions real-time to reflect changes in the topology and/or traffic. Dynamic routing techniques include distance vector routing and link state routing.

With the shortest path routing technique for selecting a virtual circuit, the shortest physical path between the source machine and the destination machine is selected. The routing decision is generally made once when a virtual circuit is being set up, and maintained for the remainder of the session. However, using shortest path routing on a per-request basis often leads to sub-optimal or even highly congested network solutions, and is not considered a good design practice.

Generally, in any given ATM network, the links with varying amounts of bandwidth can support a multitude of services using both point-to-point and point-to-multipoint routing mechanisms. Each of these services, when multiplexed over a common stream, needs optimal allocation of network resources based on global information across the entire network. From a network provider perspective, the routing strategy can be planned in a number of different ways to maximize revenue generation.

The present invention is concerned with finding an optimal routing solution that ensures minimum cost of routing with maximum bandwidth usage, while maintaining the QoS parameters within the user-specified threshold values.

Unlike conventional source (e.g., static) routing or dynamic routing schemes, the route discovery engine of the present invention constantly changes its decision based on the current traffic profile across all the links in the network. The engine uses a priori knowledge of the traffic pattern so that the decisions can be made in a real-time system without any significant delay.

Some researchers have tried to address this type of time-series prediction problem through expert systems. Their biggest drawback is the inflexibility caused by static, rule-based algorithms that require a priori knowledge of the system dynamics, and the need for human expertise to improve their performance. Moreover, statistical interpolation methods (e.g., using ARMA/ARIMA models) have limited success in certain situations, but the underlying assumption of linear system dynamics renders the model ineffective in most cases involving complex traffic patterns, which are highly non-linear.

The present invention is concerned with addressing the above issues by adapting an artificial neural network-based learning and prediction strategy to provide optimal routing selection and traffic management in a communication network.

Research efforts to date have produced various neural network-based approaches for parameter estimation and trend analysis of dynamic systems. The majority of these methods are based on state feedback, an approach limited by the availability of system states. However, in a typical communication network, such as an ATM network, the states are difficult to measure without employing elaborate, model-dependent state estimators and sensing devices. This makes the implementation of the traffic prediction algorithms based on state feedback very difficult.

These drawbacks have motivated the present research towards development of a neural network-based prediction scheme that makes use of only output measurements as they become available from sensor readings.

The Backpropagation Algorithm is a known neural network learning technique that looks for the minimum of an error function in weight space using the method of gradient descent. The combination of weights which minimizes the error function is considered to be a solution of the learning problem. However, ordinary backpropagation networks are unable to learn temporal and context sensitive patterns.

Accordingly, it would be desirable to provide a neural network-based prediction scheme employing a variant of the backpropagation network that makes use of only output measurements of a network to provide optimal routing selection and traffic management in a communication network.

The present invention provides a system having the above and other advantages.

SUMMARY OF THE INVENTION

The present invention relates to a method and apparatus for a neural network-based prediction scheme that makes use of only output measurements of a network to provide optimal routing selection and traffic management in a communication network.

A method is presented for determining an optimal route for transmission of data in a communication network that has several nodes interconnected by associated links. The method comprises the steps of: monitoring data traffic of at least particular ones of the links to obtain respective traffic histories thereof. The traffic may refer to a data rate such as bits/sec or cells/sec, for example. The monitoring may occur over a period of time such as hours, days, or weeks, for example. Next, a neural network is trained using the traffic histories to obtain respective predicted traffic profiles of the particular links.

The respective predicted traffic profiles are provided to a route discovery engine, along with topology information of the communication network. The route discovery engine processes the respective predicted traffic profiles and topology information, along with service request data, to select particular links for communicating data in the communication network.

Essentially, links are selected to provide a path with the lowest "cost" that also meets minimum feasibility requirements such as bandwidth and quality of service.

The topology information may include node/link names, available link capacity, cell processing time, cost of routing, and so forth.

Information indicative of the selected link(s) is communicated to particular node(s) associated with the links. Typically, the nodes are routers, in which case the information is communicated as routing table update information. The updated table information is stored at the router and accessed to determine the appropriate output link for each packet or cell received by the router on an input link.

The respective predicted traffic profiles may account for notified exceptions and logical exceptions. These are user-selected conditions for adjusting the selected path based on unusual situations such as links and nodes under repair, or expected unusually high or low traffic conditions.

Selection of the particular link(s) in the optimal communication path may be achieved by applying a shortest-path algorithm at the route discovery engine to the input parameters, e.g., the respective predicted traffic profiles, topology information, and service request data.

The neural network is preferably an autoregressive back-propagation network, in which case the method includes the further steps of determining respective feedback weights and feedforward weights for at least particular ones of the nodes; iteratively updating the respective feedback and feedforward weights to minimize an output error of the neural network; and selecting particular links for communicating data according to the respective updated feedforward and feedback weights.

The links may be selected at a user-to-network interface or network-to-network interface.

The method may include the further steps of providing a plurality of candidate routes comprising the links for communicating data in the communication network; providing a set of "n" network parameters ($c_1, \ldots, c_n$) for each of the candidate routes; calculating a cost function for each of the candidate routes according to a weighted sum of the network parameters thereof; and selecting one of the candidate routes according to the associated cost function for communicating data in the communication network.

For example, the network parameters may include some or all of: link cost, peak cell rate, sustainable cell rate, intrinsic burst tolerance, cell delay variation, maximum allocated cell delay variation tolerance, cell loss ratio, and route length.

Additionally, limits may be provided for at least some of the network parameters for each of the candidate routes. For example, the link cost may be required to be in a certain range for a route to be acceptable. A determination is made as to whether the network parameters are within the associated limit; and one of the candidate routes is selected according to whether the network parameters thereof are within the associated limits.

The data traffic is preferably transmitted in the communication network using Asynchronous Transfer Mode (ATM).

An apparatus in accordance with the present invention includes a route discovery engine, a monitoring facility, and a neural network associated with the route discovery engine and the monitoring facility. The monitoring facility monitors data traffic of one or more of the links of a communication network to obtain respective traffic histories, and provides a corresponding signal to the neural network. The neural network receives this signal and calculates respective predicted traffic profiles of the particular links, and provides a corresponding signal to the route discovery engine. The route discovery engine receives the signal from the neural network and a signal indicative of a topology of the communication network, and selects different links for communicating data in the communication network.

The neural network receives a signal indicative of at least one of user-designated (a) notified exceptions and (b) logical exceptions for use in calculating the respective predicted traffic profiles.

The route discovery engine applies a shortest-path algorithm to select the particular link(s).

A transmitter associated with the route discovery engine transmits information indicative of the selected links(s) to particular node(s) associated with the links.

A routing table update function associated with the route discovery engine may be provided for communicating routing table update information indicative of the selected link(s) to the associated node(s).

When the neural network is an autoregressive backpropagation network, the neural network includes a processor for determining respective feedback weights and feedforward weights for the nodes, and for iteratively updating the respective feedback weights and feedforward weights to minimize an output error of the neural network.

Moreover, the route discovery engine evaluates a plurality of candidate routes comprising (e.g., traversing) the links for communicating data in the communication network according to a set of "n" network parameters ($c_1, \ldots, c_n$) for each of the candidate routes. The route discovery engine includes a processor adapted to calculate a cost function for each of the candidate routes according to a weighted sum of the network parameters thereof; wherein the route discovery engine selects one of the candidate routes according to the associated cost function for communicating data in the communication network.

The route discovery engine may be responsive to limits for at least some of the network parameters for each of the candidate routes, in which case the route discovery engine includes a processor adapted to determine whether the network parameters are within the associated limit; where the route discovery engine is adapted to select one of the candidate routes according to whether the network parameters thereof are within the associated limits.

DETAILED DESCRIPTION OF THE INVENTION

The present invention relates to a method and apparatus for using neural computing techniques to optimize route selection in a communication network.

The term "network" is used herein to refer to any network, internet, subnet or the like.

To circumvent the inability of ordinary backpropagation networks to learn temporal and context sensitive patterns, the present invention employs an Autoregressive Backpropagation Network to surpass the commonly used static mapping methods. This is essentially a topological variation of the backpropagation network, where additional autoregressive memory to individual neurons helps to encode state information internally in a recursive manner.

Figure 1:
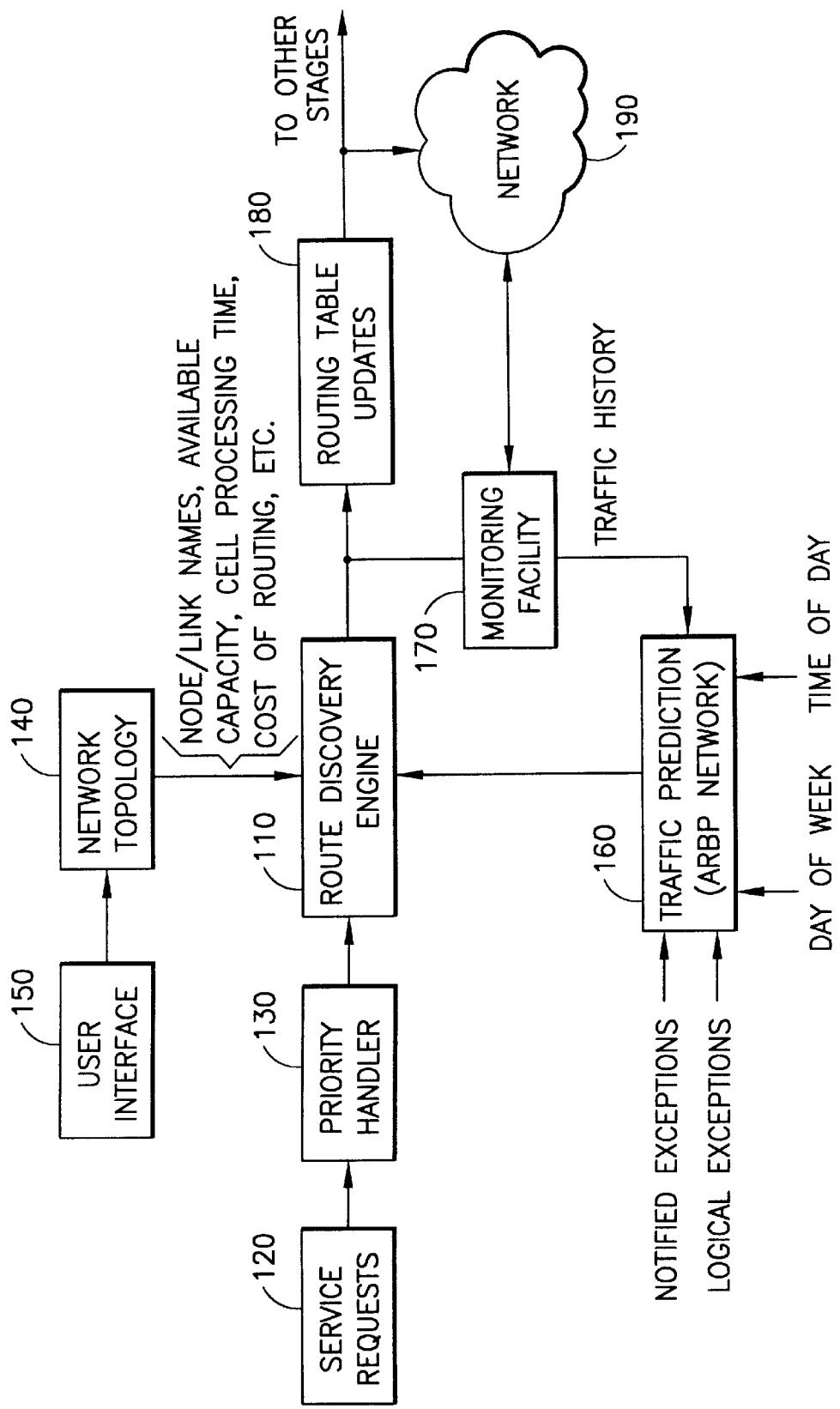
FIG. 1 illustrates a system architecture in accordance with the present invention.

The output of the ARBP network is in the form of a predicted traffic profile, to which Dijkstra's shortest path algorithm is applied to determine an optimal route for a given connection request. For a discussion of Dijkstra's shortest path algorithm, refer to A. S. Tanenbaum, Computer Networks, $3^{rd}$ ed. Prentice-Hall, Inc., (1996), sec. 5.2.2. Here, the objective function being optimized is a linear function of several network parameters such as cost and delay, subject to feasibility constraints. The choice of the optimal route algorithm is not critical. Dijkstra's algorithm is chosen for its efficiency and its relative simplicity. One can also use Lagrange's Multiplier method or the Penalty function method, but these are not as computationally efficient as Dijkstra's algorithm FIG. 1 illustrates a system architecture in accordance with the present invention. The system architecture is provided as a process flow and may be implemented using known computer circuitry and coding techniques. The essential elements of the traffic management system are shown. In any given ATM network, the elements should be implemented at both the UNI (to work in conjunction with nodal CAC algorithm and UPC constraints) and NNI (to work in conjunction with network CAC algorithm and QoS constraints). Thus, the architecture of FIG. 1 is repeated in stages for each additional node.

The core of the architecture is the route discovery engine 110 that takes service requests from a service request function 120 and through a priority handler 130. A service request may be a request to establish a connection between two machines, for example.

The priority handler 130 is a two-tier pre-processor that sends the loss/delay sensitive traffic to a high priority buffer and loss/delay tolerant traffic to a low priority buffer. This guarantees multiple QoS on a shared media to support diverse applications. In order to route traffic through an ATM network, there are constraints other than the shortest path to consider, such as the bandwidth already consumed in different links, available link and switch capacities, cell processing time, cost of routing, and so on. These values change continuously with the traffic profile across the network. Furthermore, these values are a function of network topology and are provided to the route discovery engine 110 from a network topology function 140. The network topology function may be updated via a user interface 150.

A monitoring facility 170 monitors the traffic of a network 190 to provide a traffic history to the ARBP network 160. Note that the ARBP network may be implemented using a computer, or by using dedicated hardware such as a Digital Signal Processing (DSP)/Application-Specific integrated Circuit (ASIC). Generally, some type of processor is considered to be associated with the ARBP network 160 even if the processor serves other functions as well. Similarly, the route discovery engine 110 may be implemented using a computer or dedicated hardware. Generally, some type of processor is considered to be associated with the route discovery engine 110 if the processor serves other functions as well.

The route discovery engine 110 updates the initial set of values provided by the network operator during run-time based on the predicted traffic profile from the neural network 160. The neural network 160 is an ARBP network that receives the time of day, and day of week, notified exceptions and logical exceptions. Notified exceptions are user-designated parameters that may account for periods of unusual network activity. For example, during holidays or other times, network activity may be unusually high or low. Logical exceptions are user-designated parameters that may indicate problems with the network, such as nodes or links that are under repair. In this case, traffic must be routed around the problem area.

The route discovery engine provides information regarding the optimal virtual circuit for transmitting data to a routing table update function 180. The routing table update function 180 includes a transmitter that transmits the appropriate data to the different nodes (e.g., routers) in the network 190, and to the subsequent stage for the next node. Typically, each router has a table with one entry per open virtual circuit passing through it. Each packet traveling in the network has a virtual circuit number field in its header. When a cell or packet arrives at a router, the router knows which line it arrived on, and what the virtual circuit number is, and can therefore forward the cell or packet on the correct output line (e.g., link).

Training the Neural Network

Autoregressive Backpropagation (ARBP) networks are recurrent networks where the nodes only have linear feedback to the individual outputs. For backrgound, see, e.g., R. R. Leighton and B. C. Conrath, "The Autoregressive Backpropagation Algorithm," *International Conference on Neural Networks*, vol. II, pp. 369–377, 1991, incorporated herein by reference. The AR node equations are:

$$o_i(t) = f[net_i(t) + m_i(t)]$$

where, $$net_i(t) = bias_i + \sum_{j=1}^{ninputs_i} w_{j,i} o_j(t),$$

$$f(x) = \frac{1}{1 + e^{-x}} - 0.5, \text{ and}$$

$$m_i(t) = \sum_{n=1}^{order_i} a_{i,n} o_i(t-n)$$

Here, $o_i(t)$ represents the output of node i at time t, $w_{j,i}$ is the feedforward weight from node j to node i, $a_{i,n}$ is the feedback weight from the nth delay element of node i, $ninputs_i$ is the number of input nodes to the ith node, j is an index through this set of input nodes, and $order_i$ is the number of feedback delays for the ith node. The feedback weights ($a_{i,n}$) and the feedforward weights ($w_{j,i}$) are adaptive. The standard backpropagation algorithm is modified here to discrete time-varying systems by including feedback weights, which are also adjusted to minimize the mean squared error. The output error measure is defined as $E = \sum_{t=T_0}^{T_1} E(t)$, where $E(t) = \frac{1}{2} \sum_i (d_i - o_i)^2$ and $d_i$ represents the desired value of the ith output node. The weight changes are accumulated between temporal references $T_0$ and $T_1$. The weights are then changed and the process is repeated in successive iterations. Steepest descent method is applied to change the feedforward weights ($a_{i,n}$) to minimize the output error E. The weight update formulas are given by the following equations.

Output layer:

$$\delta_i = d_i(t) - o_i(t)$$

$$\Delta w_{j,i}(t) = \eta \delta_i \left[ f'(net_i(t)) o_j(t) + \sum_{n=1}^{n_d} a_{i,n} \frac{\partial o_i(t-n)}{\partial w_{j,i}} \right]$$

$$\Delta a_{i,n}(t) = \eta \delta_i \left[ o_i(t-n) + a_{i,n} \frac{\partial o_i(t-n)}{\partial a_{i,n}} \right]$$

Hidden layer:

$$\delta_l = -\frac{\partial E}{\partial o_l} = \sum_{k=1}^{n_o} \delta_k \frac{\partial o_k(t)}{\partial o_l(t)}$$

$$\Delta w_{m,l} = \eta \delta_l \left[ f'(net_l(t)) o_m(t) + \sum_{n=1}^{n_d} a_{l,n} \frac{\partial o_l(t-n)}{\partial w_{m,l}} \right]$$

$$\Delta a_{l,n}(t) = \eta \delta_l \left[ o_l(t-n) + a_{l,n} \frac{\partial o_l(t-n)}{\partial a_{l,n}} \right]$$

In the above equations, $\eta$ is the learning rate, $n_d$ is the number of delay elements (i.e., order of each neuron), $w_{j,i}$ and $w_{m,l}$ are output and hidden layer weights, respectively, and $a_{i,n}$ and $a_{l,n}$ are the digital filter coefficients (feedback weights) of the output and hidden layer, respectively.

As is known, a neural network may have an input layer, one or more hidden layers, and an output layer. The input layer includes input sites that are entry points for information, but do not perform computations. The hidden layer(s) receive the input information and perform calculations, The results are transmitted to output sites at the output layer. The desired number of hidden layers is considered to be a design choice within the purview of one of ordinary skill in the art.

Figure 2A:
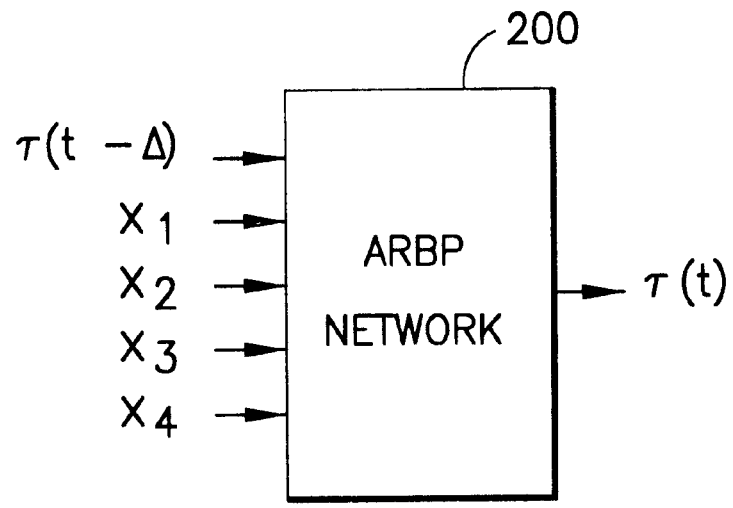
FIG. 2(a) illustrates off-line training of the ARBP network in accordance with the present invention.

FIG. 2(a) illustrates off-line training of the ARBP network 200 in accordance with the present invention.

Consider an ATM network with n number of connected links. The goal of the training is to identify the temporal traffic profile $\tau(t) \in R^n$ in all the links, which is chosen as the target vector for training. $\tau(t)$ is an n-dimensional vector. For example, for a ten-link network, the traffic in links 1, . . . , 10, respectively, is $\tau_1(t)$, . . . , $\tau_{10}(t)$. The traffic may designate the number of ATM cells or bits present on the link at the time t, for example.

The inputs of the network consist of $\tau(t-\Delta)$ (delayed values of $\tau(t)$, computed off-line), $x_1 \in R^n$ (time of day, assuming discrete values between 1 and 23 in increments of 1), $x_2 \in R^n$ (day of week, assuming discrete values between one and seven in increments of one), and $x_3, x_4 \in R^n$ (notified and logical exceptions respectively, assuming discrete values between user defined [min, max] interval to shape the traffic profile in a desired manner).

The network is trained using generalized delta rules. The additional adaptive feedforward weights enhance the capacity of the network to perform dynamic mapping. Several measures are taken to improve the speed of convergence and to avoid the problem of getting stuck in a local minimum on the error surface. In addition to using a momentum term, an adaptive learning rate is also employed. Essentially, this provides a trade-off between a large learning rate (which results in rapid learning at the beginning followed by subsequent oscillatory behavior) and a small learning rate (which results in stable behavior at the cost of longer training time) in a continuous fashion. For further details, see A. Chaudhuri et al., "Neural Network Based Modeling and Control of a Flexible-Link Manipulator," *World Auto-*

*mation Congress*, vol. 1, pp. 449–454, Maui, Hi., August. 1994, incorporated herein by reference.

In order to reduce the number of epochs, we have adapted the algorithm set forth in Nguyen and Widrow, "Improving the Learning Speed of 2-layer Neural Networks by Choosing Initial Values of the Adaptive Weights," *IEEE International Joint Conference of Neural Networks*, vol. 3, pp. 21–26, July, 1990, which provides an elegant approach for choosing initial weights and biases of the network (instead of a random initialization) based on a range of inputs and outputs. The network converged to a minimum after 12,600 epochs. However, use of this algorithm is not required.

Recall of the Trained Network

Figure 2B:
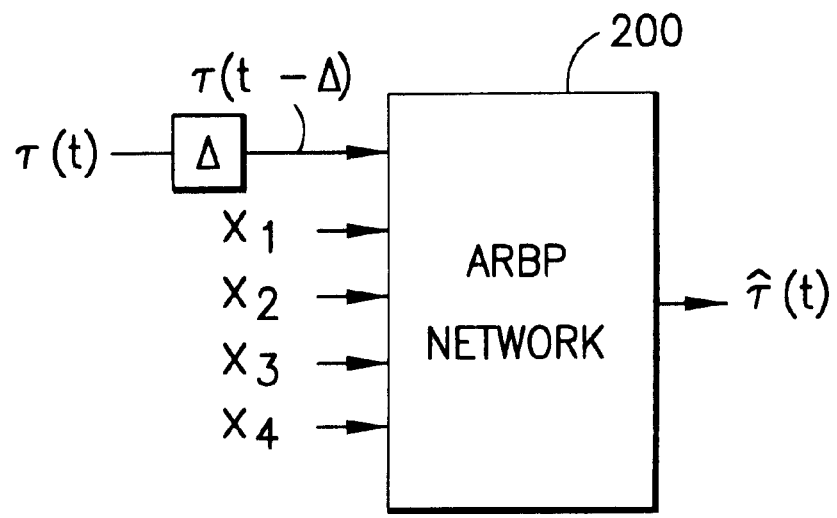
FIG. 2(b) illustrates recall of the trained network in accordance with the present invention.

FIG. 2(*b*) illustrates recall of the trained network 200 in accordance with the present invention. In the recall phase, performance of the trained network is tested using input signals $x_i$ (i=1, . . . , 4) and $\tau(t-\Delta)$. The output of the trained network $\hat{\tau}(t)$ is then compared with the test input $\tau(t)$ to evaluate the performance of the network.

Optimal Route Computation

Figure 3:
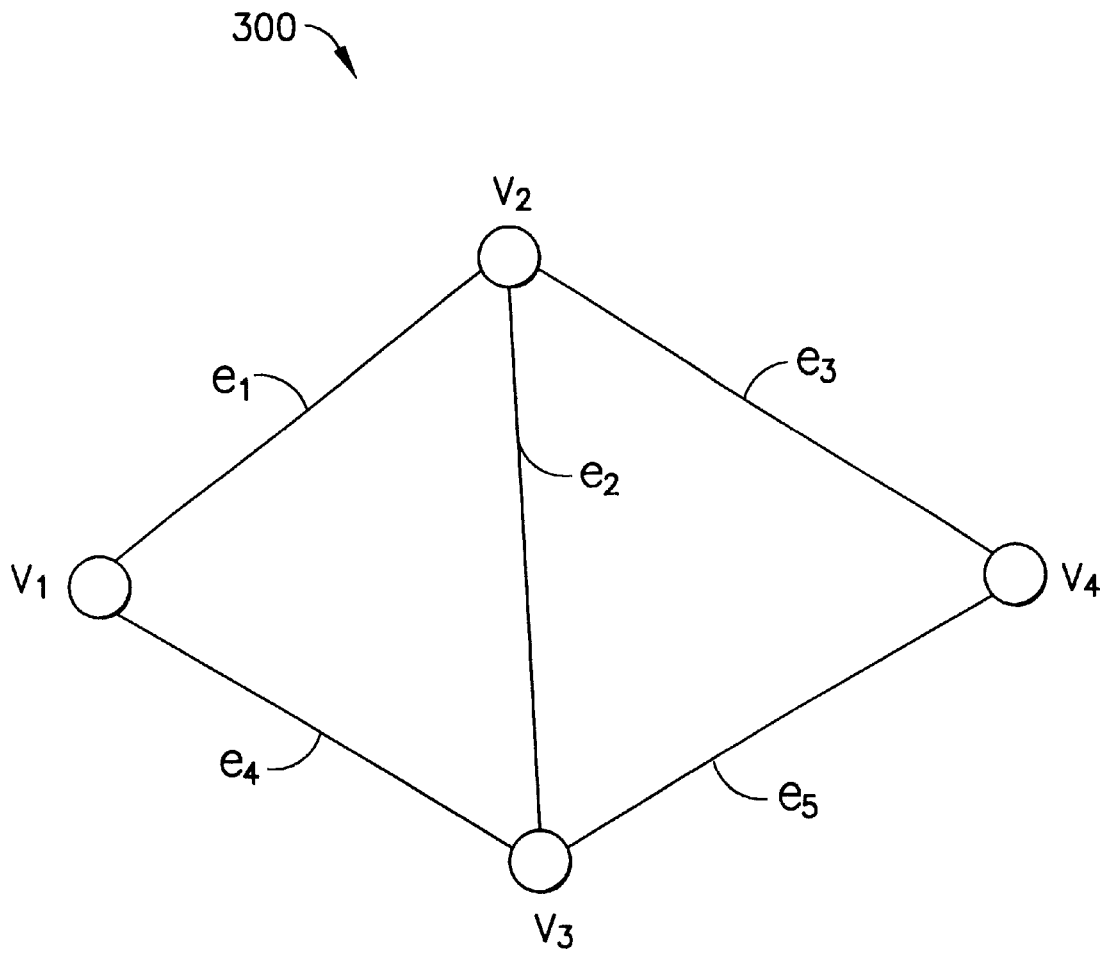
FIG. 3 illustrates an example network for route computation in accordance with the present invention.

FIG. 3 illustrates an example network for route computation in accordance with the present invention.

To make use of a predicted traffic profile $\hat{\tau}(t)$ for optimal route computation, we model a network as a labeled directed graph G=<V,E,L>, where V is the set of nodes and $E \subseteq V \times V$ is the set of links. For example, the network 300 includes a sending node $V_1$, a receiving node $V_4$, and nodes $V_2$ and $V_3$. The term "node" is used herein to encompass a switch, router, gateway, switching router or the like. The links are $e_1$–$e_5$. The term "link" is used herein to encompass a communication path between nodes. The link may be copper wire, optical fiber, or wireless path, for example. Moreover, the nodes may be at a NNI or UNI. For a NNI, a node provides data transfer between networks, while for a UNI, a node provides data transfer between a user, e.g., a host computer, and a network.

Of course, a more realistic network typically has a much more complex topography. The set of links E for the network 300 is:

(1) e1, e3
(2) e1, e2, e5
(3) e4, e5; and
(4) e4, e2, e3.

Generally, in setting up a virtual circuit, each node in a network will have one or more input links for receiving data, and one or more output links for transmitting data. Moreover, some of the links may be used for receiving or transmitting data, but not both receiving and transmitting at the same time. For example, for data transmitted from node $V_1$, $e_1$ is an input link for node $V_2$, and $e_4$ is an input link for node $V_3$. For data transmitted from node $V_2$, $e_2$ and $e_3$ are output links, and for $V_3$, $e_2$ and $e_5$ are potential output links.

Moreover, input nodes and output nodes may be defined. For example, for data to be transmitted from node $V_2$ to $V_4$, $V_1$ and $V_3$ are possible input nodes to $V_2$. If $V_1$ is an input node to $V_2$, $V_3$ and $V_4$ are possible output nodes from $V_2$. If $V_3$ is an input node to $V_2$, $V_4$ is the possible output node from $V_2$.

Furthermore, each link $e_1$, . . . , $e_6$ in the network 300 is considered to be a "hop". For example, $V_1$ to $V_2$ is one hop, and $V_2$ to $V_4$ is one hop.

L is a function that maps a link to vector relevant parameters the link can support, which is derived in part from $\hat{\tau}(t)$. A concrete set of relevant network parameters for each link $e_i$, i=1, . . . , 7, would be $$L(e)=<c_1,c_2,\ldots,c_8>.$$

where the eight parameters are, in order: link cost, peak cell rate (PCR), sustainable cell rate (SCR), intrinsic burst tolerance (IBT), cell delay variation (CDV), maximum allocated CDV tolerance (CDVT), logarithm of (1—cell loss ratio), and route length (in terms of number of hops). More or fewer parameters, and/or different parameters, may be used. Specifically, $L(e_i)$, with i=1, . . . , 8 are included, where the parameters $c_1$–$c_8$ are different for each $L(e_i)$. The parameters $c_1$–$c_8$ generally are not constants. In a more generalized notation, $$L(e_i)=<c_{1,i}, c_{2,i}, \ldots, c_{8,i}>.$$

Note that other combinations of parameters can also be used. We extend L naturally so that we can talk about the network parameters associated with a route. To do that, an operator $\oplus$ is introduced for combining vectors of network parameters so that if route p is the concatenation of routes p' and p", where p' and p" can comprise single or multiple links, $$L(p)=L(p')\oplus L(p").$$

With our chosen set of parameters, $\oplus$ is $$<c_1,\ldots,c_8>\oplus<c'_1,\ldots c'_8>=<c_1+c'_1, \min\{c_2,c'_2\}, \min\{c_3,c'_3\},$$
$$\min\{c_4,c'_4\}, c_5+c'_5, c_6+c'_6, c_7+c'_7, c_8+c'_8>.$$

This construction generalizes easily to accommodate other choices of network parameters.

Furthermore, to measure the desirability of a route, a "cost" function $\kappa$ is defined to map a vector of network parameters to a value in $R \cup \{\infty\}$. Any such measure must depend on the particulars of a connection request, because a route that fails to meet all the feasibility requirements is unacceptable. The feasibility requirements may include the QoS, cost, minimum bandwidth and so forth. To capture the feasibility requirements, $\kappa$ is defined in terms of a number of limits $C_1, C_2, \ldots, C_8$ associated with a connection request. For example, $C_1$ is a limit associated with the network parameter $C_1$. Let p be a route and $L(p)=<c_1, \ldots, c_8>$, where $c_1, \ldots, c_8$ are specific to p. In a more generalized notation, $L(p) = (c_p, \ldots, c_{p,8}>$.

The feasibility requirements for each route p are phrased as $$\delta_j c_j \leq C_j,$$

where j=1, . . . , 8 and $\delta_j = \pm 1$. With these notations defined, we define $\kappa$ (p) such that $$\kappa(p) = \begin{cases} \infty & \text{if } \delta_j c_j > C_j \text{ for some } j \\ \lambda_1 c_1 + \ldots + \lambda_8 c_8 & \text{otherwise} \end{cases}$$

where the $\lambda_j$s are (positive) constants, and $\kappa$ defines a linear objective function parameters. Thus, the optimal route "p" is chosen from available candidate routes based on the associated cost function, which in turn is a function of a weighted sum of the associated network parameters, e.g., $c_1, \ldots, c_8$.

A technique is now presented for computing optimal routes, which is based on Dijkstra's shortest path algorithm. The "shortest" path may measured in terms of number of hops, geographic distance, mean queuing and transmission delay, bandwidth, average traffic, cost, measured delay or other factors.

The present invention provides a shortest path technique that uses an elementary abstract data structure called a priority queue, which supports, among others, the following operations: (1) EMPTY-PRIORITY-QUEUE, which returns an empty priority queue; (2) INSERT (Q,u,v), which inserts an element u with key value v into priority queue Q; (3) EXTRACT-MIN (Q), which deletes the element of Q with the minimum key value and return a reference to the element; and (4) CHANGE-PRIORITY (Q,u,v), which changes the key of u to v. The code is written in MATLAB™.

| OPTIMAL-ROUTE |
| --- |
| 1  ▷ s = source of connection request; |
| 2  ▷ pred[v] = predecessor of v on optimal route from s to v |
| 3     Q ← EMPTY-PRIORITY-QUEUE |
| 4     for each v ∈ V\{s} do |
| 5        route_params[v] ← L(<s,v>) |
| 6        pred[v] ← NIL |
| 7        INSERT (Q, v, κ (route_params[v])) |
| 8     S ← {s} |
| 9     while Q non-empty do |
| 10       u ← EXTRACT-MIN (Q) |
| 11       S ← S ∪ {u} |
| 12       for each v adjacent to u and v ≠ s do |
| 13          if κ (route_params[v]) >κ (route_params[u] ⊕ L(<u,v>)) then |
| 14             route_params[v] ← route-params[u] ⊕L(<u,v>) |
| 15             pred[v] ← u |
| 16             CHANGE-PRIORITY(Q,v,κ(route_params[v])) |

Simulations

Figure 4A:
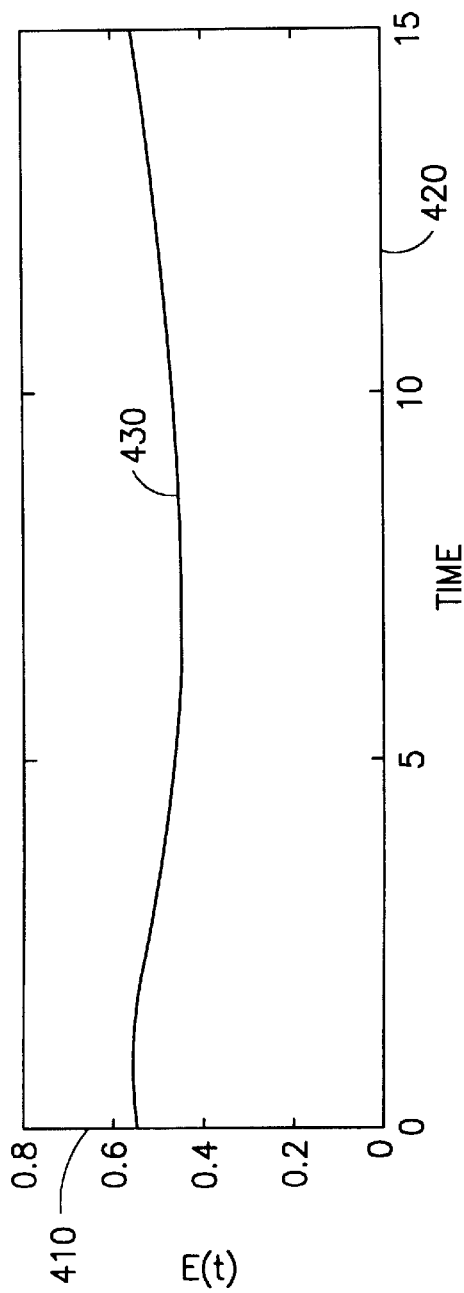
FIG. 4(a) illustrates an error between actual and predicted traffic in accordance with the present invention.
Figure 4B:
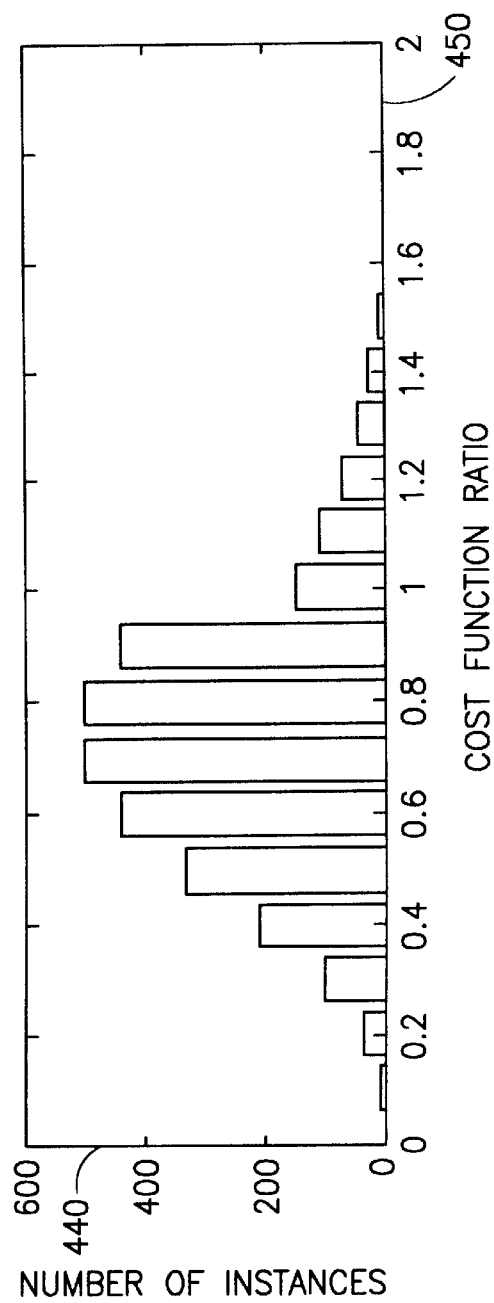
FIG. 4(b) illustrates a histogram of a cost function ratio in accordance with the present invention.

FIG. 4(a) illustrates an error between actual and predicted traffic in accordance with the present invention. FIG. 4(b) illustrates a histogram of a cost function ratio in accordance with the present invention.

Simulations were conducted using MATLAB™ and SIMULINK™ software. A 20-node network (n=20)was used to train the ARBP for traffic prediction across all the links. The response of the trained network is shown in FIG. 4(a), where $E(t)=\|\hat{\tau}(t)-\tau(t)\|$ on the y-axis represents the absolute value of the difference between the predicted and the actual traffic profile. In this example, $\hat{\tau}(t)$ and $\tau(t)$ are vectors with length twenty, so E(t) is taken as the sum of the differences between the actual traffic on a node i, $\tau_i(t)$, and the predicted traffic for the node, $\hat{\tau}_i(t)$.

E(t) may have units of bits/sec. or cells/sec., for example. Time, in seconds, is shown on the x-axis 420. As demonstrated through the results, e.g., trace 430, the ARBP network of the present invention was able to predict the traffic profile with a reasonably good accuracy.

To evaluate the performance of the route discovery algorithm, the cost function ratio $\kappa_{opt}/\kappa_{min}$ was computed for a large number of service requests and predicted traffic profiles. Here, $\kappa_{opt}$ represents the value of the cost function using all the constraints of the optimization, and $\kappa_{min}$ represents the value of the cost function using only the last constraint for least path consideration.

In the histogram in FIG. 4(b), the y-axis 440 indicates the number of instances, or simulation trials, while the x-axis 450 indicates a cost function ratio. The multi-variable constrained optimization method outperformed the conventional least-path searching algorithm in the majority of the instances, e.g., where the cost function ratio is less than one.

As seen, the present invention discloses an Autoregressive Backpropagation Network-based strategy for traffic prediction and route discovery in computer networks, such as ATM networks. This approach was motivated by difficulties in finding an optimal routing solution to ensure minimum cost of routing with maximum bandwidth usage, while maintaining the QoS parameters within a specific range. The responses of the trained network and the route discovery engine have demonstrated conformity to the expected performance level. The prediction mechanism and the optimization strategy developed in this context is fairly generic, and can be extended to other types of networks supporting multimedia traffic with a wide range of QoS specifications.

The invention allows the development of multimedia applications in broadband networks that are delay sensitive and have strict requirements for QoS. From a network operator perspective, the invention maximizes revenue generation by ensuring minimum cost of routing with maximum bandwidth usage, and by maintaining the QoS parameters within the user-specified threshold values.

The invention is suitable for use in communicating data to one or more decoders in a subscriber network.

While the invention was discussed in connection with an ATM network, the invention is suitable for use with other protocols, such as IP and the OSI family of protocols.

Although the invention has been described in connection with various specific embodiments, those skilled in the art will appreciate that numerous adaptations and modifications may be made thereto without departing from the spirit and scope of the invention as set forth in the claims.

For example, the traffic prediction of the invention using an ARBP network can be applied to different technical fields, including Predictive Capacity Management to enable an access network to periodically negotiate the amount of bandwidth it will require over a particular route some time in advance, and network planning and upgrading.

What is claimed is:

1. A method for determining an optimal route for transmission of data in a communication network comprising a plurality of nodes and associated links connected thereto, comprising the steps of:

monitoring data traffic of at least particular ones of said links to obtain respective traffic histories thereof;

training a neural network using said traffic histories to obtain respective predicted traffic profiles of said particular links;

providing the respective predicted traffic profiles to a route discovery engine;

providing topology information of said communication network to said route discovery engine; and processing the respective predicted traffic profiles and topology information at said route discovery engine utilizing a shortest-path algorithm to select at least one of said particular links for communicating the data in said communication network.

2. The method of claim 1, comprising the further step of:

communicating information indicative of the selected link(s) to particular node(s) associated therewith.

3. The method of claim 2, wherein:

said information is communicated as routing table update information.

4. The method of claim 1, wherein:

said respective predicted traffic profiles account for at least one of user-designated (a) notified exceptions and (b) logical exceptions.

5. The method of claim 1, wherein said neural network is an autoregressive backpropagation network, and said training step comprises the further steps of:
- determining respective feedback weights and feedforward weights for at least particular ones of said nodes;
- iteratively updating said respective feedback weights and feedforward weights to minimize an output error of said neural network.

6. The method of claim 1, wherein:
said at least one of said particular links is selected at a user-to-network interface.

7. The method of claim 1, wherein:
said at least one of said particular links is selected at a network-to-network interface.

8. The method of claim 1, comprising the further steps of:
- providing a plurality of candidate routes comprising said links for communicating data in said communication network;
- providing a set of "n" network parameters $<c_1, \ldots, c_n>$ for each of said candidate routes;
- calculating a cost function for each of said candidate routes according to a weighted sum of the network parameters thereof; and
- selecting one of said candidate routes according to the associated cost function for communicating data in said communication network.

9. The method of claim 8, comprising the further steps of:
- providing limits for at least some of the network parameters for each of said candidate routes;
- determining whether the network parameters are within the associated limit; and
- selecting one of said candidate routes according to whether the network parameters thereof are within the associated limits.

10. The method of claim 8, wherein said network parameters include at least one of:
link cost; peak cell rate; sustainable cell rate; intrinsic burst tolerance; cell delay variation; maximum allocated cell delay variation tolerance; cell loss ratio; and route length.

11. The method of claim 1, wherein:
the data traffic is transmitted in the communication network using Asynchronous Transfer Mode (ATM).

12. An apparatus for determining an optimal route for transmission of data in a communication network comprising a plurality of nodes and associated links connected thereto, comprising:
- means for monitoring data traffic of at least particular ones of said links to obtain respective traffic histories thereof;
- means for training a neural network using said traffic histories to obtain respective predicted traffic profiles of said particular links; and
- means for processing the respective predicted traffic profiles and topology information of said communication network utilizing a shortest-path algorithm to select at least one of said particular links for communicating the data in said communication network.

13. The apparatus of claim 12, further comprising:
means for communicating information indicative of the selected link(s) to particular node(s) associated therewith.

14. The apparatus of claim 13, wherein:
said information is communicated as routing table update information.

15. The apparatus of claim 12, wherein:
said respective predicted traffic profiles account for at least one of user-designated (a) notified exceptions and (b) logical exceptions.

16. The apparatus of claim 12, wherein said neural network is an autoregressive backpropagation network, and said training means comprises:
- means for determining respective feedback weights and feedforward weights for at least particular ones of said nodes; and
- means for iteratively updating said respective feedback weights and feedforward weights to minimize an output error of said neural network.

17. The apparatus of claim 12, wherein:
said at least one of said particular links is selected at a user-to-network interface.

18. The apparatus of claim 12, wherein:
said at least one of said particular links is selected at a network-to-network interface.

19. The apparatus of claim 12, further comprising:
- means for providing a plurality of candidate routes comprising said links for communicating data in said communication network;
- means for providing a set of "n" network parameters $<c_1, \ldots, c_n>$ for each of said candidate routes;
- means for calculating a cost function for each of said candidate routes according to a weighted sum of the network parameters thereof; and
- means for selecting one of said candidate routes according to the associated cost function for communicating data in said communication network.

20. The apparatus of claim 19, further comprising:
- means for providing limits for at least some of the network parameters for each of said candidate routes;
- means for determining whether the network parameters are within the associated limit; and
- means for selecting one of said candidate routes according to whether the network parameters thereof are within the associated limits.

21. The apparatus of claim 19, wherein said network parameters include at least one of:
link cost; peak cell rate; sustainable cell rate; intrinsic burst tolerance; cell delay variation; maximum allocated cell delay variation tolerance; cell loss ratio; and route length.

22. The apparatus of claim 12, wherein:
the data traffic is transmitted in the communication network using Asynchronous Transfer Mode (ATM).

23. An apparatus for determining an optimal route for transmission of data in a communication network comprising a plurality of nodes and associated links connected thereto, comprising:
- a route discovery engine;
- a monitoring facility; and
- a neural network associated with said route discovery engine and said monitoring facility; wherein:
- said monitoring facility is adapted to monitor data traffic of at least particular ones of said links to obtain respective traffic histories thereof, and to provide a corresponding signal to said neural network;
- said neural network is adapted to receive the signal corresponding to the traffic histories for use in calculating respective predicted traffic profiles of said particular links, and to provide a corresponding signal to said route discovery engine; and said route discovery engine is adapted to receive and process the signal corresponding to the predicted traffic profiles and a signal indicative of a topology of said communication network utilizing a shortest-path algorithm to select at least one of said particular links for communicating the data in said communication network.

24. The apparatus of claim 23, further comprising:
a transmitter associated with said route discovery engine;
said transmitter transmitting information indicative of the selected links(s) to particular node(s) associated therewith.

25. The apparatus of claim 23, further comprising:
a routing table update function associated with said route discovery engine for communicating routing table update information indicative of the selected link(s) to particular node(s) associated therewith.

26. The apparatus of claim 23, wherein:
said neural network is adapted to receive a signal indicative of at least one of user-designated (a) notified exceptions and (b) logical exceptions for use in calculating said respective predicted traffic profiles.

27. The apparatus of claim 23, wherein said neural network is an autoregressive backpropagation network, said neural network comprising:
a processor for determining respective feedback weights and feedforward weights for at least particular ones of said nodes, and for iteratively updating said respective feedback weights and feedforward weights to minimize an output error of said neural network.

28. The apparatus of claim 23, wherein:
said at least one of said particular links is selected at a user-to-network interface.

29. The apparatus of claim 23, wherein:
said at least one of said particular links is selected at a network-to-network interface.

30. The apparatus of claim 23, wherein said route discovery engine evaluates a plurality of candidate routes comprising said links for communicating data in said communication network according to a set of "n" network parameters $<c_1, \ldots, c_n>$ for each of said candidate routes, said route discovery engine comprising:
a processor adapted to calculate a cost function for each of said candidate routes according to a weighted sum of the network parameters thereof; wherein:
said route discovery engine is adapted to select one of said candidate routes according to the associated cost function for communicating data in said communication network.

31. The apparatus of claim 30, wherein said route discovery engine is responsive to limits for at least some of the network parameters for each of said candidate routes, said route discovery engine comprising:
a processor adapted to determine whether the network parameters are within the associated limit;
said route discovery engine adapted to select one of said candidate routes according to whether the network parameters thereof are within the associated limits.

32. The apparatus of claim 30, wherein said network parameters include at least one of:
link cost; peak cell rate; sustainable cell rate; intrinsic burst tolerance; cell delay variation; maximum allocated cell delay variation tolerance; cell loss ratio; and route length.

33. The apparatus of claim 23, wherein:
the data traffic is transmitted in the communication network using Asynchronous Transfer Mode (ATM).

34. A method for determining an optimal route for transmission of data in a communication network comprising a plurality of nodes and associated links connected thereto, comprising the steps of:
monitoring data traffic of at least particular ones of said links to obtain respective traffic histories thereof;
training a neural network using said traffic histories to obtain respective predicted traffic profiles of said particular links, said respective predicted traffic profiles accounting for at least one of user-designated (a) notified exceptions and (b) logical exceptions;
providing the respective predicted traffic profiles to a route discovery engine;
providing topology information of said communication network to said route discovery engine; and
processing the respective predicted traffic profiles and topology information at said route discovery engine to select at least one of said particular links for communicating the data in said communication network.

35. An apparatus for determining an optimal route for transmission of data in a communication network comprising a plurality of nodes and associated links connected thereto, comprising:
means for monitoring data traffic of at least particular ones of said links to obtain respective traffic histories thereof;
means for training a neural network using said traffic histories to obtain respective predicted traffic profiles of said particular links, said respective predicted traffic profiles accounting for at least one of user-designated (a) notified exceptions and (b) logical exceptions; and
means for processing the respective predicted traffic profiles and topology information of said communication network to select at least one of said particular links for communicating the data in said communication network.

36. An apparatus for determining an optimal route for transmission of data in a communication network comprising a plurality of nodes and associated links connected thereto, comprising:
a route discovery engine;
a monitoring facility; and
a neural network associated with said route discovery engine and said monitoring facility; wherein:
said monitoring facility is adapted to monitor data traffic of at least particular ones of said links to obtain respective traffic histories thereof, and to provide a corresponding signal to said neural network;
said neural network is adapted to: (1) receive the signal corresponding to the traffic histories for use in calculating respective predicted traffic profiles of said particular links, said respective predicted traffic profiles accounting for at least one of user-designated (a) notified exceptions and (b) logical exceptions; and (2) provide a corresponding signal to said route discovery engine; and
said route discovery engine is adapted to receive and process the signal corresponding to the predicted traffic profiles and a signal indicative of a topology of said communication network to select at least one of said particular links for communicating the data in said communication network.

37. A method for determining an optimal route for transmission of data in a communication network comprising a plurality of nodes and associated links connected thereto, comprising the steps of:

monitoring data traffic of at least particular ones of said links to obtain respective traffic histories thereof;

training a neural network using said traffic histories to obtain respective predicted traffic profiles of said particular links;

providing the respective predicted traffic profiles to a route discovery engine;

providing topology information of said communication network to said route discovery engine; and processing the respective predicted traffic profiles and topology information at said route discovery engine to select at least one of said particular links for communicating the data in said communication network, wherein at least one of said particular links is selected at a network-to-network interface.

38. A method for determining an optimal route for transmission of data in a communication network comprising a plurality of nodes and associated links connected thereto, comprising the steps of:

monitoring data traffic of at least particular ones of said links to obtain respective traffic histories thereof;

training a neural network using said traffic histories to obtain respective predicted traffic profiles of said particular links;

providing the respective predicted traffic profiles to a route discovery engine;

providing topology information of said communication network to said route discovery engine;

processing the respective predicted traffic profiles and topology information at said route discovery engine to select at least one of said particular links for communicating the data in said communication network;

providing a plurality of candidate routes comprising said links for communicating said data in said communication network;

providing a set of "n" network parameters $<C_1, \ldots, C_n>$ for each of said candidate routes;

calculating a cost function for each of said candidate routes according to a weighted sum of the network parameters thereof; and selecting one of said candidate routes according to the associated cost function for communicating said data in said communication network.

39. The method of claim 38, comprising the further steps of:

providing limits for at least some of the network parameters for each of said candidate routes;

determining whether the network parameters are within the associated limits; and selecting one of said candidate routes according to whether the network parameters thereof are within the associated limits.

40. The method of claim 38, wherein said network parameters include at least one of:

link cost; peak cell rate; sustainable cell rate; intrinsic burst tolerance; cell delay variation; maximum allocated cell delay variation tolerance; cell loss ratio; and route length.

\* \* \* \* \*